(No Model.)

J. BARRETT.
LIFTING JACK.

No. 293,400. Patented Feb. 12, 1884.

Witnesses:
J. W. Garner
D. Pattison

Inventor:
J. Barrett,
per
J. A. Lehmann, Atty.

UNITED STATES PATENT OFFICE.

JOSIAH BARRETT, OF ALLEGHENY, PENNSYLVANIA.

LIFTING-JACK.

SPECIFICATION forming part of Letters Patent No. 293,400, dated February 12, 1884.

Application filed December 14, 1883. (No model.)

*To all whom it may concern:*

Be it known that I, JOSIAH BARRETT, a citizen of the United States, residing at Allegheny, in the county of Allegheny and State of Pennsylvania, have invented certain new and useful Improvements in Lifting-Jacks, of which the following is a specification, reference being had therein to the accompanying drawings.

My invention relates to an improvement in lifting-jacks; and it consists in an application of two alternately-acting pawls, one of them acting at the upstroke and the other at the downstroke of a lever or handle, for raising or lowering the lifting-bar of the jack, as will be fully described hereinafter.

The accompanying drawings represent my invention.

Figure 1:
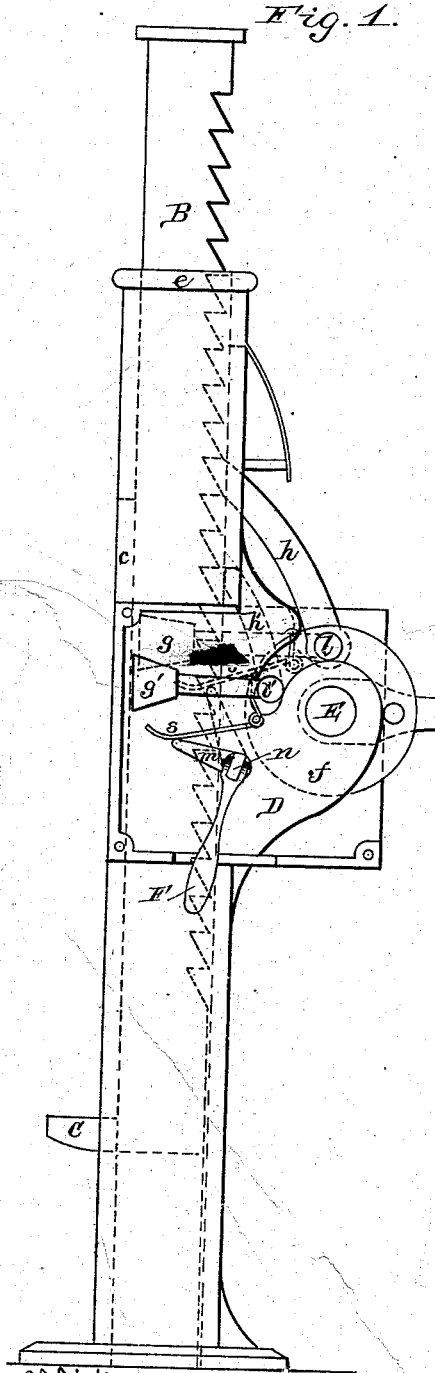
Figure 2:
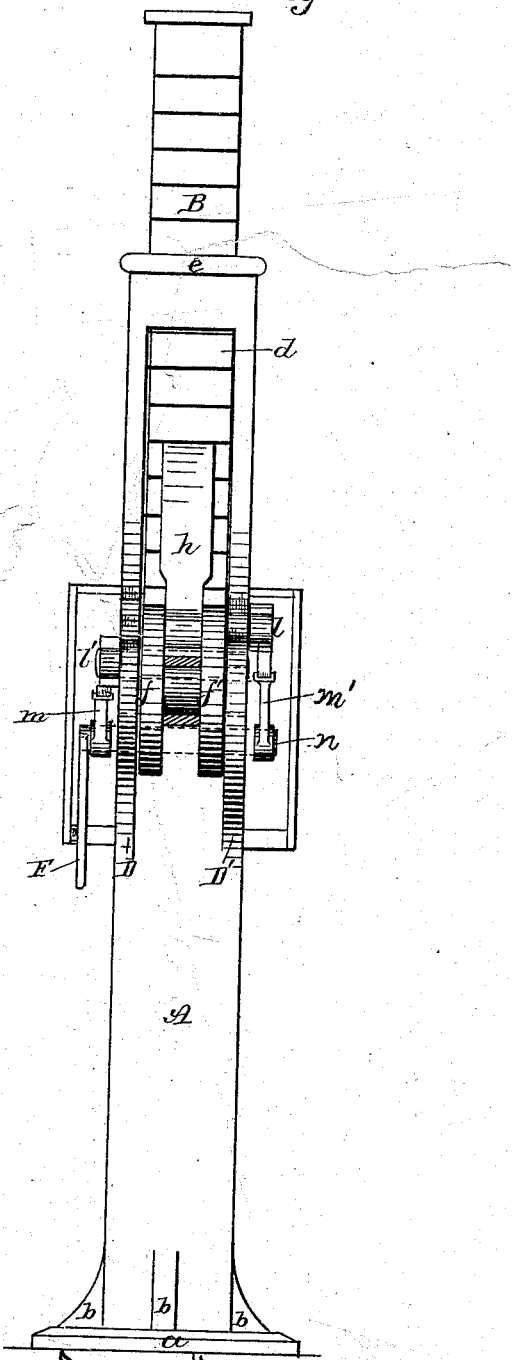

Figure 1 is a side view of the jack, showing its working mechanism; Fig. 2, a front view.

A represents a square box, in cross-section, open at its top and bottom, and of about one-half the height of the jack when raised to its utmost. The box rests on a foot, $a$, and is supported by braces $b$. At the back of the box is an opening, $c$, extending to nearly two-thirds of its height from the foot upward, and in front is an opening, $d$, nearly of the width of the box, that begins where the former ends, and extends upward to the top, where the box is surrounded by a band, $e$. Within the box A stands a ratchet lifting-bar B, that fills its interior, of which bar the ratchet side is turned forward. From the rear of the lower end of the lifting-bar projects a lifting-piece, C, which is raised and lowered with the bar and moves up or down in the opening $c$. To the sides of the box A, where the front opening, $d$, begins, are firmly attached two brackets, D D', opposite to one another. These brackets project forward beyond the box, and in them is pivoted a lever or handle, E, that has attached to each side of its pivoted end a disk, $f$ and $f'$, which disks turn back and forth when the handle is raised or lowered. The disks and the pivoted end of the handle fill the space between the brackets in front of the box. From the inside of the disk $f$ horizontally extends a small shaft or spindle, $l$, through the disk $f'$, projecting beyond the bracket D', at the end of which spindle is a weighted lever, $g$; and from the inside of the disk $f'$ extends a similar spindle, $l'$, through the disk $f$ and bracket D, with weighted lever $g'$ at its end. The spindles $l\,l'$ are at a distance from each other equal to the distances between two notches on the ratchet, and so placed that when the handle E is held level and a vertical line drawn upward from the center of its pivot one of the spindles is found at one side of it and the other on the other side, so that by moving the handle up or down one of the spindles will be lowered as much as the other is raised. On the spindles $l$ and $l'$, between the disks $f$ and $f'$, are secured two pawls, $h\,h'$, one on each, of which $h$, the longer of them, reaches over the other. The free ends of the pawls lean against the ratchet on the lifting-bar B, and by the alternate motion of the handle one of them is made to lift the bar, while the other enters the notch next presented by the rising bar, and in its turn lifts when the motion of the handle is reversed. To cause the lifting-bar to descend by the same motion of the handle, after having been raised, the lever F at the side of the box is pushed up, by which a spindle, $n$, that projects from both sides, is partly turned. On the projecting ends of the spindle $n$ are cranks $m$, that when turned up alternately raise the springs $s\,s$, attached to the weighted levers, removing thereby the weight or downward pressure that holds the pawls against the ratchet, and slightly raising the pawls successively. If the handle E be raised, the lower pawl drops, while the upper holds the lifting-bar; and when the handle is pressed down the lower pawl upholds the same, while the upper one drops to the notch next above. In this manner the lifting-bar is raised and again lowered by the same motion of the handle, requiring only a change of position of a lever to reverse its direction by being brought in contact with the springs.

Having thus described my invention, I claim—

1. In a lifting-jack, the pawls $h\,h'$, provided with counter-weights, and placed the one above the other, and alternately acting in raising or lowering the lifting-bar, substantially as described.

2. In a lifting-jack, the lever E, with the disks $f\,f'$, in combination with the pawls $h\,h'$, weighted levers $g\,g'$, springs $s\,s$, crank $m$, and lever F, arranged substantially as shown and described.

In testimony whereof I affix my signature in presence of two witnesses.

JOSIAH BARRETT.

Witnesses:
LOUIS MOESER,
T. F. LEHMANN.